United States Patent [19]
Ferri

[11] Patent Number: 5,621,657
[45] Date of Patent: Apr. 15, 1997

[54] AUTOMATIC DETECTION OF AIR FLOW TRANSDUCER TYPE UNDER SOFTWARE CONTROL

[75] Inventor: Vincent Ferri, Pittsburgh, Pa.

[73] Assignee: Westinghouse Air Brake Company, Wilmerding, Pa.

[21] Appl. No.: 533,370

[22] Filed: Sep. 25, 1995

[51] Int. Cl.$^6$ ..................... G06G 7/57
[52] U.S. Cl. ............. 364/510; 364/426.01; 73/861.42; 303/155
[58] Field of Search ............... 364/510, 426.01; 303/15, 33, 155, 20, 3, 86, 1, 70; 73/199, 4 R, 861.42, 861.79

[56] References Cited

U.S. PATENT DOCUMENTS

| | | | |
|---|---|---|---|
| 3,957,314 | 5/1976 | Falke | 303/3 |
| 4,344,138 | 8/1982 | Frasier | 364/426 |
| 4,550,747 | 11/1985 | Woodworth et al. | 137/487.5 |
| 4,574,643 | 3/1986 | Scoot et al. | 364/510 |
| 4,904,027 | 2/1990 | Skantar et al. | 303/15 |
| 4,946,229 | 8/1990 | Deno et al. | 330/33 |
| 5,222,788 | 6/1993 | Dimsa et al. | 303/15 |
| 5,286,096 | 2/1994 | Ferri et al. | 303/15 |
| 5,537,014 | 7/1996 | Kettle, Jr. et al. | 318/375 |

Primary Examiner—Emanuel T. Voeltz
Assistant Examiner—Hien Vo
Attorney, Agent, or Firm—James Ray & Associates

[57] ABSTRACT

Method and apparatus to enable a computer to determine which of two types of transducer systems in a fluid pressure communication conduit the computer is connected to. One system includes two pressure transducers attached to pressure taps in the conduit, the outputs of these being subtracted in the computer to obtain a pressure difference. The other system includes a differential pressure transducer to measure pressure difference between the two pressure taps. The computer makes a determination as to which of the two systems it is connected to by identifying a time when the airflow in the conduit is zero, and at that time comparing the output of the transducer which may be either one of two types with a voltage level corresponding to zero pressure for a pressure transducer, and a voltage level corresponding to zero flow for a differential pressure transducer.

20 Claims, 5 Drawing Sheets

AUTOMATIC DETECTION OF AIR FLOW TRANSDUCER TYPE UNDER SOFTWARE CONTROL

FIELD OF THE INVENTION

This invention applies to the measurement of fluid flow in a pipe or other conduit based on transducer data which is processed by a computer, and it applies particularly to railroad airbrake systems.

CROSS REFERENCE TO RELATED APPLICATIONS

This invention is closely related to the application entitled SOFTWARE NULLIFICATION OF TRANSDUCER INDUCED OFFSET ERRORS WITHIN A FLOW RATE MEASUREMENT SYSTEM, filed Jan. 23, 1995 with Ser. No. 08/376,823. That application is by the inventor of the present application, and is assigned to the assignee of the present application. The teachings of that application are incorporated into the present application by reference thereto.

BACKGROUND OF THE INVENTION

In the classical railroad air brake system, as developed from the Westinghouse air brake, the brake air line, which passes from the locomotive and from car to car down the length of the train, provides two basic functions.

First, it is used to charge compressed air tanks in the railroad cars. The air stored in these tanks provides the energy needed to apply the brake shoes when a brake application is required. When the train is running normally, and no brake application is needed, a high pressure in the range from 70 to 110 pounds exists in the brake air line. The tanks in the cars are charged to the same pressure as the air in the brake air line.

Second, when a brake application is required, air is exhausted from the brake air line, causing the pressure in the brake air line to be reduced. In the cars of the train, this reduction of pressure is used as a signal to apply the brakes. In this event, valving in the cars utilizes the compressed air in the tanks to apply pressure to the brake shoes so that the brakes are applied.

After a train has been stopped by an application of the air brakes, the air pressure in the tanks on the cars of the train is depleted. In order for the train to operate safely, the engineer must wait until the tanks are recharged before he puts the train in motion.

In order for the engineer to know when the tanks are charged, a flow measuring system is used to indicate the flow rate of air from a compressor in the locomotive to a valve which supplies air to the brake pipe in the locomotive. When this flow stops, the engineer knows that the tanks in the cars are fully charged, and that it is safe to proceed.

A flowblock is installed in the line from the main reservoir to the valve which supplies air to the brake pipe. In the flowblock, the air flow is passed through an orifice, and two transducers are used to obtain pressure information which is supplied to a computer which calculates the air flow.

Generally, an upstream transducer measures pressure at a pressure tap in the line upstream of the orifice. In addition, a downstream transducer responsive to pressure obtained from a tap in the orifice is used in conjunction with the upstream transducer in order to obtain sufficient data to calculate the air flow. The downstream transducer may be either one of two different types, depending on the accuracy which is required. The first of the two types is a simple pressure transducer which measures the pressure in the orifice. The difference between the pressure upstream of the orifice, and the pressure in the orifice is used as a basis for calculating the flow rate of the air. A person skilled in the art will recognize that Bernoulli's equation can be used to calculate a value for the flow rate of the air. The second of the two types is a differential transducer which measures the pressure difference between the upstream pressure tap, and the pressure tap at the orifice.

A flow measurement system in which the downstream transducer is a differential transducer is more accurate than a flow measurement system in which the downstream transducer is a simple pressure transducer because a system using a differential transducer does not require subtraction of the numerical values of two independent physical measurements. It is desirable to avoid subtraction because subtraction generally degrades the accuracy of the final result because the percentage error in the difference of two quantities having the same sign is greater than the individual percentage errors in either of the two quantities.

Regardless of which type of system is used, two transducer signals are supplied to analog-to-digital converters in the computer. For either type of system, one or more programs in the computer use the digital outputs of the converters to calculate the flow rate.

In the prior art systems, there is no automatic method for the computer to determine which of the two types of transducer is employed as the downstream transducer. This information must be determined in order for the computer to properly process the transducer information to obtain flow rate.

To provide additional information on railroad airbrake systems, as background for the present patent, the teachings of the following United States patents are incorporated herein by reference thereto; in addition to the copending application cited above.

U.S. Pat. No. 4,904,027 by Skantar and Sanders: DIGITAL AIR BRAKE CONTROL SYSTEM.

U.S. Pat. No. 5,192,118 by Balukin, Newingham and Jerina: ELECTRO-PNEUMATIC LOCOMOTIVE BRAKE CONTROL SYSTEM.

U.S. Pat. No. 5,222,788 by Dimsa and Jenets: MICROPROCESSOR BASED ELECTRO-PNEUMATIC LOCOMOTIVE BRAKE CONTROL SYSTEM HAVING BRAKE ASSURANCE CIRCUIT.

Each of these patents is assigned to the assignee of the present invention.

SUMMARY OF THE INVENTION

In a first aspect, the present invention provides a computer system for receiving pressure transducer data to calculate the flow rate of fluid in a conduit. The system to which the invention pertains includes a fluid flow conduit having local variations of flowpath and pressure taps having fluid pressure connection to pressure transducers. A differential pressure for calculation of fluid flow rate may be obtained either by subtraction of the pressure signals from two pressure transducers, or a differential pressure may be obtained from a differential pressure transducer which has fluid pressure connection to two taps; the latter configuration being more accurate. The outputs of the transducers are fed to analog to digital input ports of the computer system. The purpose of the invention is to make it possible to connect the same computer system to either of two alternative transducer configurations, and to enable the computer system to automatically determine to which of the two systems it is connected. Means are provided for identifying a time when the flow rate of fluid in the conduit is zero, at which time the output on one of the analog to digital input channels is evaluated to determine the type of transducer to which it is connected, and to generate a logical signal indicating the type of transducer. When fluid flow occurs in the channel, at least one pressure difference between taps is calculated to generate a signal from which a signal indicating flow rate is generated.

In a second aspect, the present invention provides a computer system for receiving pressure transducer data to calculate the flow rate of air in a conduit, and to determine to which of two alternative transducer configurations the computer is connected. The system to which the invention pertains includes an air flow conduit having a portion with a relatively large cross-sectional area, and another portion having a relatively small cross-sectional area. One air pressure tap is located in the former portion and another air pressure tap is located in the latter portion. These have air pressure connection to pressure transducers. One of the two alternative configurations consists of a pair of pressure transducers which measure pressures at the two taps and provide signals to two analog to digital input channels of the computer system. The other alternative configuration has a pressure transducer connected to the tap in the portion of the conduit having the larger cross-sectional area. It also has a differential pressure transducer having air pressure connection to that tap and also to the tap in the portion of the conduit having a smaller cross-section. Outputs of these two transducers may be connected to the same two analog to digital input channels of the computer system. A differential pressure for calculation of fluid flow rate may be obtained either by subtraction of the pressure signals from two pressure transducers, or a differential pressure may be obtained from a differential pressure transducer which has fluid pressure connection to two taps; the latter configuration being more accurate. The purpose of the invention is to make it possible to connect the same computer system to either of the two alternative transducer configurations, and to enable the computer system to automatically determine to which of the two systems it is connected. Means are provided for identifying a time when the flow rate of fluid in the conduit is zero, at which time the output on one of the analog to digital input channels is evaluated to determine the type of transducer to which it is connected, and to generate a logical signal indicating the type of transducer. When fluid flow occurs in the channel, at least one pressure difference between taps is calculated to generate a signal from which a signal indicating flow rate is generated.

In an additional aspect, this invention provides a method for calculating the flow rate of air in a flow passage which supplies air to a brake pipe of a railroad airbrake system. The method is adaptable to two different transducer systems, each system having at least a first transducer and a second transducer. These are connected to air pressure taps in the flow passage. The method involves determining a time when the airflow in the flow passage is zero, and generating a logical signal indicative of that condition. The output of a transducer which may be either a pressure transducer or a differential pressure transducer is compared with known voltages to determine which type of transducer is used. Then, when airflow occurs, the pressure difference between two air pressure taps in the flow passage to which transducers are attached is calculated as a basis for calculating the flowrate of the air.

OBJECTS OF THE INVENTION

It is, therefore, one of the primary objects of the present invention to provide a computer system which is capable of receiving data from two or more transducers connected to pressure taps in a fluid flow passage and to interpret the transducer data to obtain flow rate information in accordance with a determination as to which of two transducer configurations the computer is connected to.

Still another object of the present invention is to provide a computer system which is capable of receiving data from two or more transducers connected to pressure taps in an air flow passage which supplies air to the brake pipe of a railroad airbrake system and to interpret the transducer data to obtain flow rate information in accordance with a determination as to which of two transducer configurations the computer is connected to.

A further object of this invention is to provide a computer system which is capable of receiving data from two or more pressure transducers connected to pressure taps in a fluid flow passage and to interpret the pressure transducer data to obtain flow rate information.

An additional object of this invention is to provide a computer system which is capable of receiving data from a pressure transducer and a differential pressure transducer, these being connected to pressure taps in a fluid flow passage, and to interpret the transducer data to obtain flow rate information which is more accurate than is obtainable with two pressure transducers alone.

Another object of the invention is to provide apparatus and method for calculating the flow rate of air supplied to the brake pipe of a locomotive, automatically determining to which type of transducer in the air flow passage it is connected to.

Still another object of the invention is to provide a computer for calculating the flow rate of air supplied to the brake pipe of a locomotive, the computer being capable of being moved from one locomotive to another, and automatically determining to which type of transducer it is connected.

In addition to the various objects and advantages of the present invention described above, it should be noted that various other objects and advantages of the present invention will become more readily apparent to those persons who are skilled in the fluid flow measurement art from the detailed description of the invention, particularly, when such description is taken in conjunction with the attached drawings and with the appended claims.

DESCRIPTION OF THE INVENTION

Figure 1:
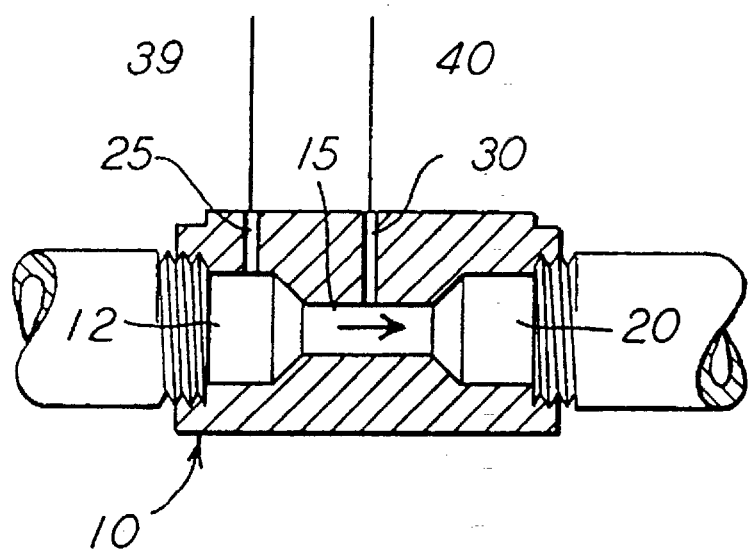
FIG. 1 is a view showing a typical flow conduit with pressure taps.

Prior to proceeding to a more detailed description of various embodiments of the present invention, for the sake of clarity and understanding of the invention, it should be noted that identical components having identical functions in each of the accompanying drawings have been identified with identical reference numerals throughout each of the several Figures illustrated herein.

FIG. 1 shows in a general way the flow conduit to which the invention applies. The conduit generally indicated as 10 contains an orifice portion 15, an upstream portion 12 and a downstream portion 20. A pressure tap 30 in the orifice portion 15 supplies pressure to a fluid pressure communication connection 40 which is connected to a transducer (not shown in this figure). A pressure tap 25 in upstream portion 12 supplies pressure to a fluid pressure communication connection 39 which is connected to a transducer (not shown in this figure).

Figure 2:
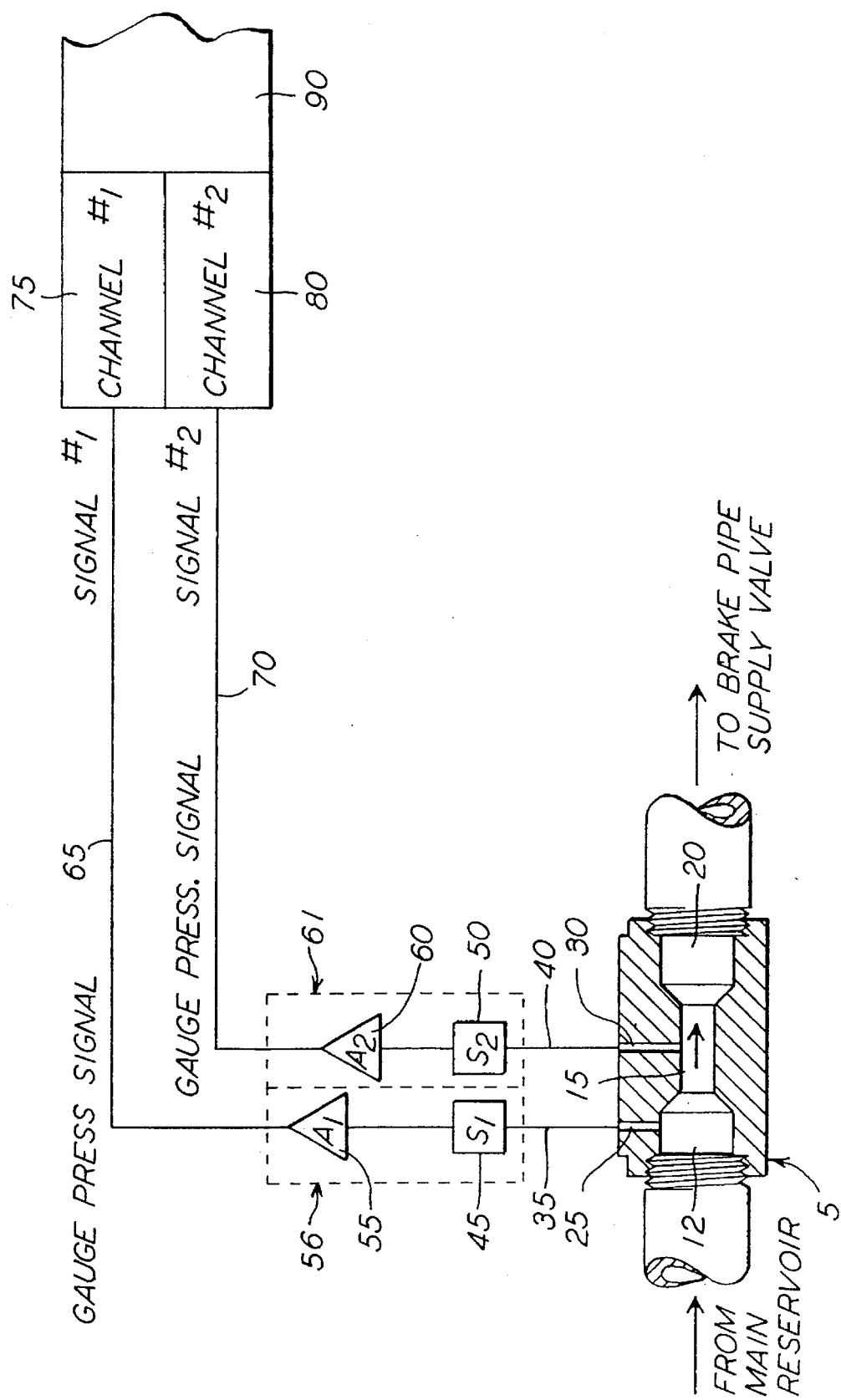
FIG. 2 is a schematic diagram showing a computer which receives data from two pressure transducers through two analog to digital input channels of the computer.
Figure 3:
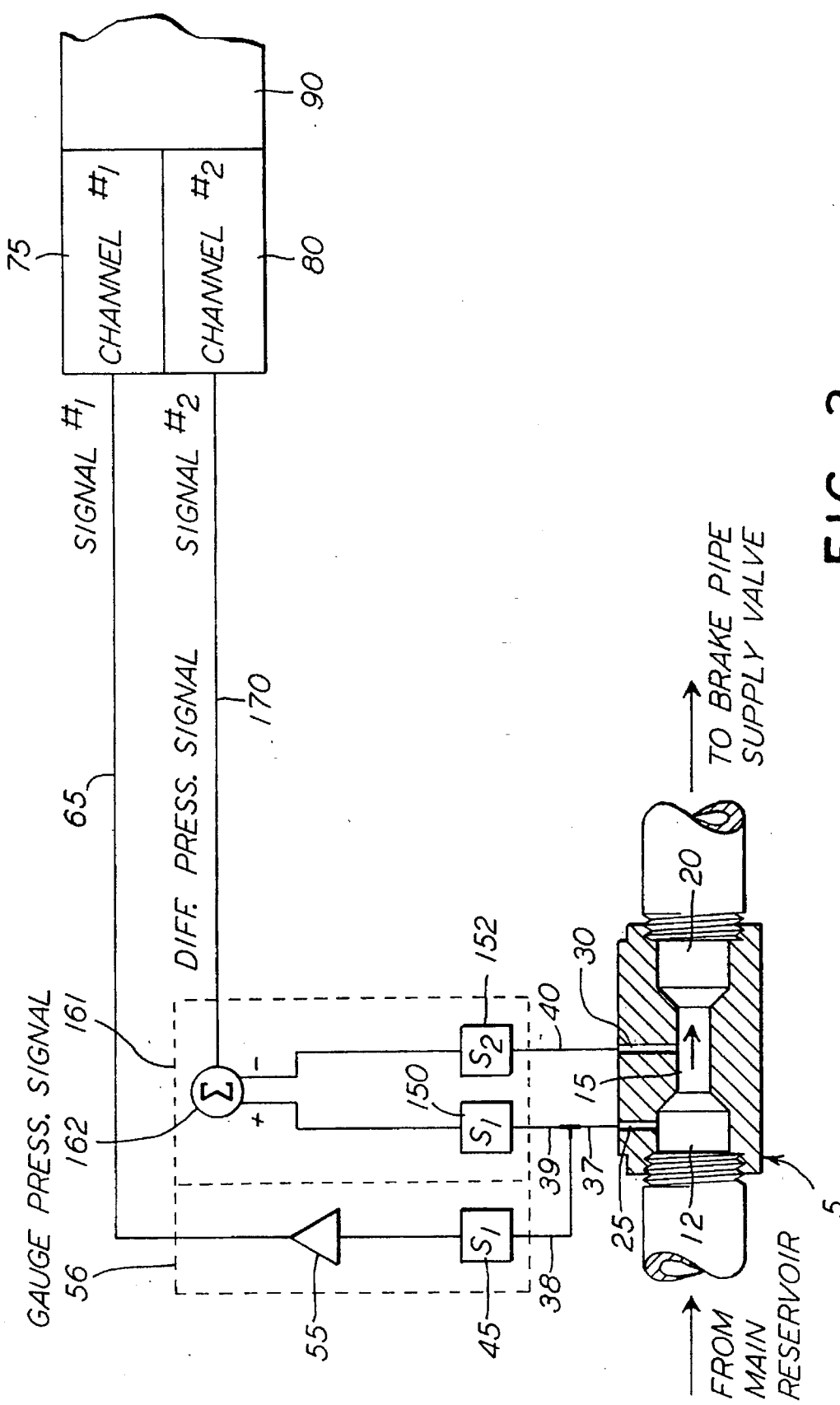
FIG. 3 is a schematic diagram showing a computer which receives data from two transducers; a pressure transducer and a differential pressure transducer, through two analog to digital input channels of the computer.

Referring to FIGS. 2 and 3, illustrated therein are the essential details of a presently preferred embodiment of the instant invention. FIG. 2 shows the invention connected to a transducer system which includes two pressure transducers. FIG. 3 shows the invention connected to a transducer system which has one pressure transducer and one differential pressure transducer.

Figure 4:
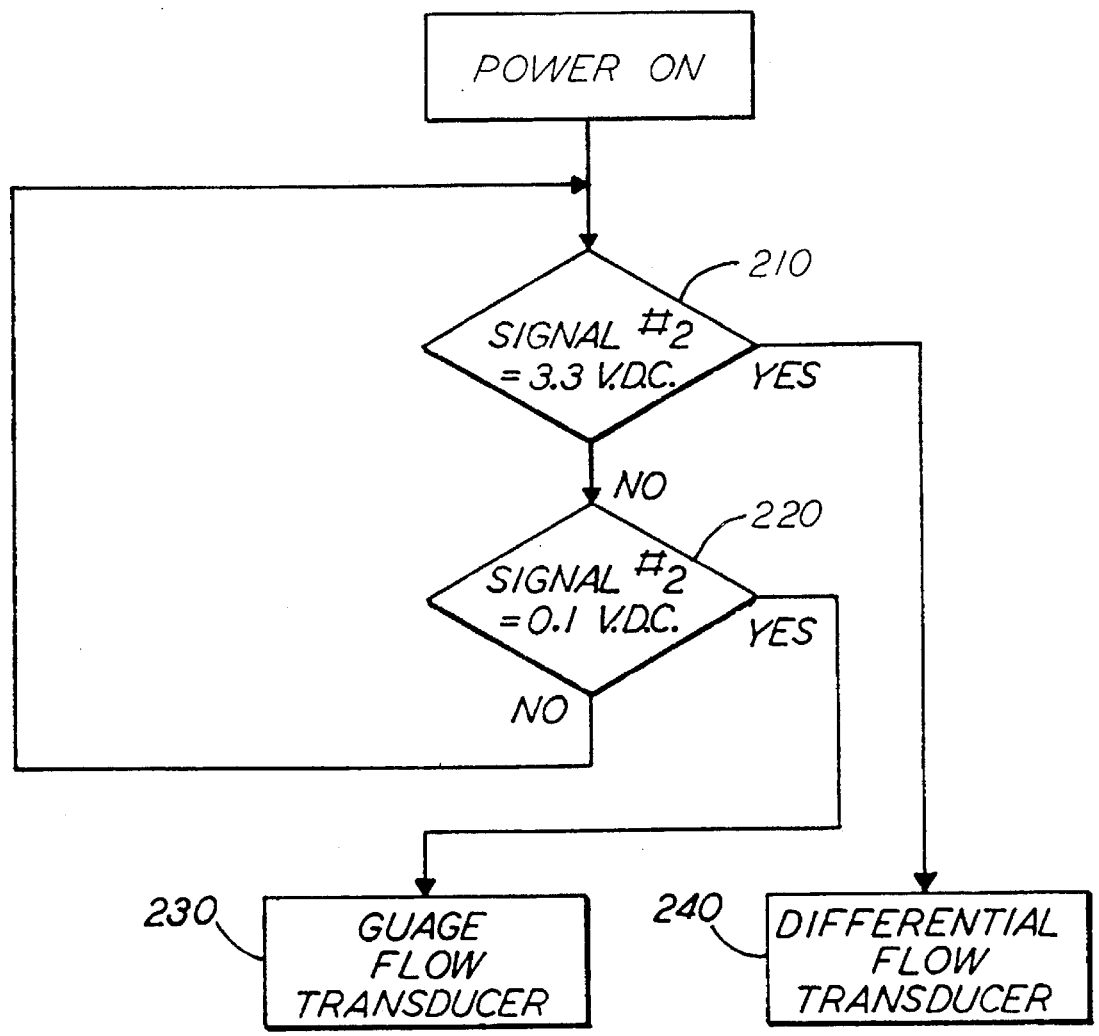
FIG. 4 shows a flow chart which the computer employs to distinguish between the two transducer configurations in which determination may be made according to this flow chart when the computer is turned on, but before fluid flow commences.
Figure 5:
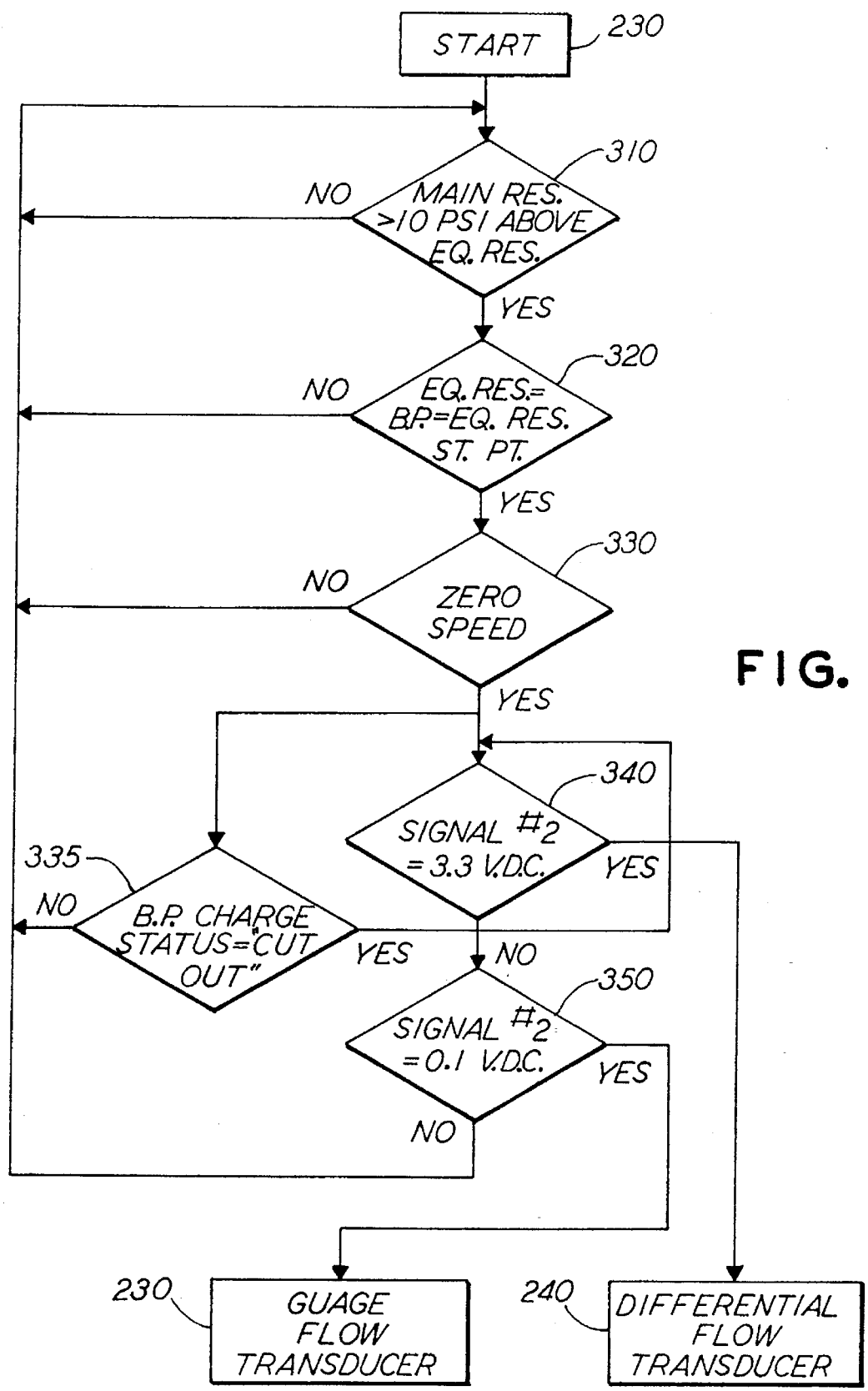
FIG. 5 shows a flow chart which the computer employs to distinguish between the two transducer configurations in a railroad airbrake system when the train is not moving, and when the indicated pressure relationships exist within the airbrake system.

Although not limited thereto or thereby, the embodiment illustrated in FIGS. 2 and 3 is for an air supply to the brake pipe of a railroad airbrake system. FIGS. 4 and 5 present flowcharts which correspond, respectively, to FIGS. 2 and 3.

In FIG. 2, 5 is a flowblock for measurement of airflow. This may be for example only the WABCO L19 flowblock. Flowblock 5 has orifice portion 15, upstream portion 12, and downstream portion 20. A pressure tap 25 samples pressure in the upstream portion 12, and communicates it via fluid pressure connection 35 to transducer element 45. A pressure tap 30 samples pressure in the orifice portion 15, and communicates it via fluid pressure connection 40 to transducer element 50. The signals generated in transducer element 45 and transducer element 50 may be amplified by amplifier 55 and amplifier 60, respectively. A first transducer unit, generally designated 56, includes transducer element 45 and amplifier 55. A second transducer unit generally designated 61 includes transducer element 50 and amplifier 60.

The output of transducer unit 56 is connected via communication line 65 to an analog to digital input channel 75 connected to computer system 90.

Likewise, the output of transducer unit 61 is connected via communication line 70 to an analog to digital input channel 80 connected to computer system 90.

In FIG. 3, 5 is a flowblock for measurement of airflow. This, also may be the WABCO L19 flowblock. Flowblock 5 has orifice portion 15, upstream portion 12, and downstream portion 20. A pressure tap 25 samples pressure in the upstream portion 12, and communicates it via fluid pressure connections 37 and 38 to transducer element 45. This pressure is also communicated via fluid pressure connections 37 and 39 to transducer element 150. A pressure tap 30 samples pressure in the orifice portion 15 and communicates it via fluid pressure connection 40 to transducer element 152. The outputs of transducer element 150 and transducer element 152 are subtracted in unit 162. An analog signal representing pressure difference is communicated via communication line 170 to analog to digital input channel 80 connected to computer system 90.

A person skilled in the art will recognize that the transducer unit shown as 161 in FIG. 3 is denoted as shown for understanding its function. Transducer unit 161 may not actually employ two transducer elements 150 and 152, but may employ a differential pressure sensor in which the two pressures are supplied to spaces on opposite sides of a membrane, and deflection of the membrane is used as a measurement of pressure difference. This is the more accurate approach.

FIGS. 4 and 5 both provide logic for distinguishing whether the configuration of FIG. 2 or the configuration of FIG. 3 is used.

FIG. 4 provides logic for determining which of the two types is used at the time the computer is turned on. Means (not shown) ensure that airflow through the flowblock 5 is not started until the computer is turned on. When it is turned on, instructions are automatically activated for implementing the logic shown in FIG. 4.

The first logical step shown in FIG. 4 uses the computer system 90 to compare signal number 2, which is received by analog to digital input channel 80, with a reference voltage which corresponds to the voltage from the differential pressure transducer 161 when there is zero airflow in the flowblock 5. This comparison is done within a tolerance which includes the tolerance of the voltage from the differential pressure transducer 161 when there is zero airflow in the flowblock 5. If the voltage of signal number 2 equals (within the appropriate tolerance) the voltage of the differential pressure transducer when there is zero flow, then a signal 240 is generated by computer system 90 which indicates that a differential transducer is used.

If the voltage from signal number 2 does not conform to this comparison, then the computer system 90 compares it to the voltage of pressure transducer 45 when there is zero pressure in the flowblock 5. If a match is found (within the appropriate tolerances), then computer system 90 generates a signal 230 indicating that a pair of simple pressure transducers 45 and 50 are employed. If a match is not found, then both tests are repeated, and this process is continued until a match is obtained. The computer then exits from the logic shown in FIG. 4, and subsequently interprets the transducer data based on signal 230 or 240.

FIG. 5 provides logic for an alternative embodiment of the invention for determining which of the two transducer types is used. This determination may be made at any time, not necessarily when the computer is turned on, provided there is zero flow through flowblock 5.

The logic illustrated schematically in FIG. 5 is provided by instructions in computer system 90. The start of this logic is denoted 300. A test designated 310 is provided so that the main reservoir pressure can be compared with pressure in the equalizing reservoir. If the main reservoir pressure exceeds the equalizing reservoir pressure by more than a predetermined amount, then test 320 is performed. If not, then test 310 is repeated.

In test 320, the brake pipe pressure is compared to the equalizing reservoir pressure and also to the equalizing setpoint pressure. If these are all equal, within an appropriate predetermined tolerance, then test 330 is performed. If these pressures are not equal, then test 310 is repeated.

Test 330 uses a signal from an axle speed sensor to determine whether the train is moving. If it is not moving, then test 340 is performed. If it is moving, then test 310 is repeated.

In test 340, signal number 2 from analog to digital input channel 80 is compared with a voltage level indicating that a differential pressure transducer is used. If that is the case, within an appropriate predetermined tolerance, then signal 240 indicating a differential pressure transducer, is generated. This signal is subsequently available within computer system 90.

If test 340 does not indicate that a differential transducer is used, then test 350 is performed. In 350, the voltage of signal number 2 from analog to digital input port 80 is compared with a voltage level indicating that a pair of pressure transducers are used. If that is the case, within an appropriate predetermined tolerance, then signal 230, which indicates that a pair of pressure transducers are used, is generated. This signal is subsequently available within computer system 90.

If test 350 does not indicate that a pair of pressure transducers are used, then test 310 is repeated.

In a presently most-preferred embodiment of this invention, the voltage level indicating that a differential pressure transducer is used is about 3.3 volts D.C., and the voltage level indicating that a pair of pressure transducers are used is about 0.1 volts D.C.

Now discussing the invention more broadly, the invention provides in a first aspect, a computer system 90 for receiving pressure transducer data from transducers 56 and 61 or 161, to calculate the flow rate of fluid in a conduit 10. In the system to which the invention pertains, conduit 10 has local variations of flowpath. The local variations of flowpath may be changes in direction of the flowpath, or changes in cross-sectional area. These changes in cross-sectional area may be from a first portion 12 having a relatively large cross-sectional area, to a second portion 15 having a relatively small cross-sectional area.

A differential pressure for calculation of flowrate may be obtained from two taps, one on the inside of a bend in the flowpath, and the other on the outside of the bend.

Alternatively, in a conduit having variations of cross-sectional area, one tap 39 may be located at a predetermined position in a section 12 of the conduit having a relatively large cross-sectional area. The predetermined position would preferably be determined from the principles of fluid mechanics to provide reproducible pressures. Another tap 30 may be located at a predetermined position in a section 15 of the conduit having a relatively small cross-sectional area. This predetermined position would also preferably be determined from the principles of fluid mechanics to provide reproducible pressures.

The portion 12 having the larger cross-sectional area may be upstream of the portion 15 having the smaller cross-sectional area, and this is at present a most-preferred embodiment. Likewise, it is desirable for the inlet to the portion having the smaller cross-section 15 to be rounded to provide smooth fluid flow into the section 15 which has the smaller cross-section.

This method of measuring fluid may be applied to either gases or to liquids. It may be applied to either laminar flow or turbulent flow.

A differential pressure for calculation of fluid flow rate may be obtained either by subtraction of the pressure signals from two pressure transducers, 56 and 61, or a differential pressure may be obtained from a differential pressure transducer 161 which has fluid pressure connections to two taps, 30 and 25. The latter configuration being more accurate. The outputs of the transducers are fed to analog to digital input ports of the computer system, 75 and 80. The computer 90 may be a digital computer. The purpose of the invention is to make it possible to connect the same computer system to either of two alternative transducer configurations, and to enable the computer system to determine automatically to which of the two systems it is connected. Means disposed in computer 90 are provided for identifying a time when the flow rate of fluid in the conduit is zero, at which time the output on analog to digital input channel 2 is evaluated to determine the type of transducer to which it is connected, and to generate a logical signal indicating the type of transducer. When fluid flow occurs in channel 10, at least one pressure difference between taps 30 and 25 is calculated to generate a signal from which a signal indicating flow rate is generated.

The term "logical signal" does not refer so much as to the form of the signal, but to the way in which it is used. A logical signal may be a voltage or current on a particular wire, the voltage or current being either "high" or "low". It also may be a set of voltages or currents on several wires which can be used to indicate "true" or "false".

In a second aspect, the present invention provides a computer system 90 for receiving data from pressure transducers 56 and 61 or 56 and 161 to calculate the flow rate of air in conduit 10, and to determine to which of two alternative transducer configurations the computer is connected. The system to which the invention pertains includes an air flow conduit 10 having a portion 12 with a relatively large cross-sectional area, and another portion 15 having a relatively small cross-sectional area. It applies particularly to the measurement of airflow to the brake pipe of a locomotive airbrake system.

One air pressure tap 25 is located in the former portion 12 and another air pressure tap 30 is located in the latter portion 15. These have air pressure connection to pressure transducers 56 and 61 or 56 and 161. One of the two alternative configurations consists of a pair of pressure transducers 56 and 61 which measure pressures at the two taps 25 and 30 and provide signals to two analog to digital input channels 75 and 80 of the computer system. The other alternative configuration has a pressure transducer connected to tap 25 in the portion of the conduit having the larger cross-sectional area. It also has a differential pressure transducer having air pressure connection to tap 25 and also to tap 30 in the portion of the conduit having a smaller cross-section. Outputs of these two transducers 56 and 161 may be connected to the same two analog to digital input channels 75 and 80 of the computer system. A differential pressure for calculation of air flow rate may be obtained either by subtraction of the pressure signals from two pressure transducers 56 and 61, or a differential pressure may be obtained from a differential pressure transducer 161 which has air pressure connection to the two taps 25 and 30; the latter configuration being more accurate. The purpose of the invention is to make it possible to connect the same computer system 90 to either of the two alternative transducer configurations, and to enable the computer system 90 to automatically determine to which of the two systems it is connected. Means disposed in computer 90 are provided for identifying a time when the flow rate of air in the conduit is zero, at which time the output on analog to digital input channel 80 is evaluated to determine the type of transducer to which it is connected, and to generate a logical signal indicating the type of transducer. When air flow occurs in the channel 10, at least one pressure difference between taps 25 and 30 is calculated to generate a signal from which a signal indicating flow rate is generated.

The computer system may determine a condition when the airflow is zero by having a program disposed in computer 90 which runs automatically when computer 90 is turned on, this being a time which is known to have zero airflow. This program directs the computer 90 to evaluate the signal from the analog to digital input channel 80 which may be attached to either of the two types of transducer. The signal from the analog to digital input channel 80 is compared with two different voltages. One of these voltages is for a pressure transducer 61 at zero pressure, and the other voltage is for a differential pressure transducer 161 at zero differential pressure (which corresponds to the condition of zero flow). If the signal from the analog to digital input channel 80 corresponds to either of these voltages, then a logical signal is generated in the computer system 90 which indicates which type of transducer is in use. If the signal from the analog to digital input channel 90 does not match with either of these voltages, then instructions in the computer cause it to repeat the tests.

The computer system may alternatively determine a time when the airflow is zero at various times during the normal operation of the locomotive, not just when the computer 90 is turned on. Means are provided in the computer system 90 for making a gamut of tests, which are sufficient to ensure that the airflow is zero. Input means are included in the computer system for receiving information indicating main reservoir pressure, equalizing reservoir pressure, equalizing reservoir setpoint value, brake pipe pressure, and information indicating axle speed from an axle speed sensor.

Instructions in the computer 90 cause it to determine whether the main reservoir pressure exceeds the equalizing reservoir pressure by a predetermined amount. This predetermined amount, may, for example, be 10 psi.

If the test above is passed, then instructions in the computer 90 cause it to make a second test in which the equalizing reservoir pressure is compared to the equalizing reservoir setpoint pressure and to the brake pipe pressure. These comparisons are made using a tolerance range which is obtained from characteristics of the system, such as the tolerances of the transducers.

The relevant tolerances may be the tolerance of the transducer which measures pressure in the brake pipe, and the tolerance for measurement of pressure in the equalizing reservoir. The relevant tolerance may also be the tolerance of the transducer which measures pressure in the brake pipe, and a tolerance for determination of equalizing reservoir setpoint pressure, If the preceding test indicates equality of the three pressures, then a test is made to determine whether the train is at zero speed. If it is, then the signal from the analog to digital input channel 80 which may be connected to either a pressure transducer or to a differential pressure transducer is compared with two reference voltages. One of these corresponds to a pressure transducer 61 at zero pressure. The other corresponds to a differential pressure transducer 161 at zero pressure difference.

If equality with one of the two reference voltages is obtained, then the computer system generates a logical signal indicating which of the two transducer types 61 or 161 is connected to that analog to digital input channel 80. If equality is not obtained, within the predetermined tolerance range, then the gamut of tests is repeated.

In an additional aspect, the invention provides a method for calculating the flow rate of air in a flow passage supplying air to the brake pipe of a railroad airbrake system; this method being adaptable to two different transducer configurations. Each transducer configuration has at least a first transducer and a second transducer. This method includes generating a first logical signal indicating a time when the flow rate of the air is zero. At a time when the first logical signal indicates zero flow rate of air, the output of the second transducer is compared with at least two predetermined signal levels to generate a second logical signal indicating which of two transducer types is used for the second transducer.

In order to be absolutely certain that there is zero air flow, a test 335 is preformed to determine if the brake pipe charge status is equal to cutout. If such brake pipe charge status is equal test 340 is then preformed. On the other hand, if such brake pipe charge status is not equal to cutout, we perform test number 310.

The second logical signal is then used to interpret the transducer signals to obtain a pressure difference between the two air pressure taps. If both transducers are pressure transducers, then the computer subtracts the pressures indicated by the two transducers. If the second transducer is a differential pressure transducer, then the computer uses its output to obtain the pressure difference between the two air pressure taps.

This pressure difference us used, along with a pressure reading from the first transducer to obtain the flow rate of the air. A person skilled in the art will recognize that Bernoulli's equation can be used to obtain a flow rate for the air based on the pressure and the pressure difference.

In one method according to this invention, the condition of zero airflow is provided by ensuring that the computer is turned on before the air flow is started. A set of instructions in the computer is activated automatically when the computer is turned on. That set of instructions detects the transducer type and generates one or more signals indicating transducer type, and then exits from that set of instructions. The signal or signals obtained before airflow starts is then maintained subsequently, after airflow commences, for interpretation of transducer data.

Another method for determining a time when airflow is zero consists of making a number of tests which together indicate a time of zero airflow. In one test, a comparison is made to determine whether the pressure in the main reservoir of the locomotive exceeds the pressure in the equalizing reservoir of the locomotive by a predetermined amount. Another test is made comparing the pressure in the equalizing reservoir with the pressure in the brake pipe, and a similar test is made comparing the pressure in the brake pipe, the setpoint pressure of the equalizing reservoir and the brake pipe charge status. If these conditions are met, then data from an axle speed sensor is used to determine that the locomotive is at zero speed. If all these conditions are met, then the output of the second transducer is used to generate a logical signal indicating which of the two transducer types is used.

One of the tests made by this method to determine the type of transducer is in use may be to compare its output to the output of a pressure transducer at zero pressure. Another test is to compare its output to the output of a differential pressure transducer at zero flow.

While the presently preferred embodiment (and various additional alternative embodiments) for carrying out the instant invention has (have) been set forth in detail in accordance with the Patent Act, those persons skilled in the railroad airbrake art will recognize various alternative ways of practicing the invention without departing from the spirit and scope of the appended claims.

Accordingly, to promote the progress of science and useful arts, I secure for myself by Letters Patent for a limited time exclusive rights to all subject matter embraced by the following claims.

I claim:

1. An apparatus for generating at least one signal indicative of a flow rate of fluid in a fluid pressure communication conduit having local variations of flowpath and at least two pressure taps disposed at predetermined locations on such fluid pressure communication conduit, said apparatus comprising:

(a) a programmed computer system having at least two data input channels;

(b) at least one transducer adapted for fluid pressure connection to such at least two pressure taps and electrically connected to at least one of said at least two data input channels of said programmed computer system, said programmed computer system being connectable to at least two configurations of said at least one transducer; a first one of such transducer configurations includes at least two pressure transducers having fluid pressure connection to at least two of such pressure taps, outputs of such at least two pressure transducers connected to at least two of said data input channels of said computer system, and a second one of such transducer configurations includes a differential pressure transducer having fluid pressure connection to at least two of such pressure taps for measuring a pressure difference between two of such pressure taps, an output of such differential pressure transducer connected to a predetermined one of said at least one data input channel of said computer system;

(c) means disposed in said computer system for determining a condition when such flow of such fluid is equal to zero, and for generating at least one first logical signal indicative of such condition;

(d) means responsive to said first logical signal indicative of such condition when such flow of such fluid is equal to zero to receive at least one data signal from said predetermined one of said at least one data input channel to generate a second logical signal indicative of a type of transducer connected to said predetermined one of said at least one data input channel;

(e) means responsive to said second logical signal and responsive to at least one signal from at least two of said data input channels for generating at least one signal indicative of a pressure difference between at least two of such pressure taps; and (f) means responsive to said at least one signal indicative of a pressure difference between at least two of such pressure taps for generating said at least one signal indicative of such flow rate of such fluid.

2. A computer system according to claim 1 further characterized in that such variations of flowpath of such fluid pressure communication conduit include a first conduit portion having a relatively large cross-sectional area, and a second conduit portion having a relatively small cross-sectional area.

3. A computer system according to claim 2 further characterized in that a first one of such pressure taps is at a predetermined location on such first conduit portion.

4. A computer system according to claim 2 further characterized in that a second one of such pressure taps is at a predetermined location on such second conduit portion.

5. A computer system according to claim 2 further characterized in that such first conduit portion is upstream of such second conduit portion.

6. A computer system according to claim 5 wherein such second conduit portion has a rounded inlet.

7. A computer system according to claim 1 further characterized in that such fluid is a liquid.

8. A computer system according to claim 1 further characterized in that such fluid is a gas.

9. A computer system according to claim 1 further characterized in that said means responsive to said at least one signal indicative of a pressure difference between at least two of such pressure taps for generating said at least one signal indicative of such flow rate of such fluid is adapted to generate such signal indicative of such flow rate of such fluid for a case in which said fluid is in turbulent flow.

10. A computer system according to claim 1 wherein said computer is a digital computer, and at least one of said data input channels includes an analog to digital converter.

11. A computer system which includes a capability of calculating a flow rate of air in an air pressure communication conduit based on two transducer inputs, said computer system automatically determining which of two transducer configurations is in use, a first one of such transducer configurations including a pair of pressure transducers, a first one of such pair of pressure transducers having air pressure connection to a first pressure tap in a first portion of such air pressure communication conduit having relatively large cross-sectional area, and a second one of such pair of pressure transducers having air pressure connection to a second pressure tap in a second portion of such air pressure communication conduit having relatively small cross-sectional area, an output of such first one of such pair of pressure transducers being connected to a first analog to digital input channel of said computer system, an output of such second one of such pair of pressure transducers being connected to a second analog to digital input channel of said computer system, a second one of such transducer configurations including a first pressure transducer having air pressure connection to a first pressure tap in such first portion of such air pressure communication conduit having relatively large cross sectional area, such first pressure transducer connected to said first analog to digital input channel of said computer system for providing a first data signal to said computer system, such second one of such transducer configurations also having a first differential pressure transducer having a first air pressure connection to such first pressure tap in such first portion of such air pressure communication conduit and a second air pressure connection to such second pressure tap in such fluid pressure communication conduit, such first differential pressure transducer connected to said second analog to digital input channel of said computer system, for providing a second data signal to said computer system, said computer system comprising:

(a) means in said computer system for determining a condition when such flow of such air is equal to zero, and for generating at least one first logical signal indicative of such condition;

(b) means responsive to said first logical signal indicative of such condition when such flow of such air is equal to zero to use said second data signal from said second one of said at least one data input channel to generate a second logical signal indicative of a type of transducer connected to said second one of said at least one data input channel;

(c) means responsive to said second logical signal and responsive to at least one signal from at least two of said data input channels for generating at least one signal indicative of a pressure difference between at least two of such pressure taps;

(d) means responsive to said at least one signal indicative of a pressure difference between at least two of such pressure taps for generating said at least one signal indicative of such flow rate of such air.

12. A computer system according to claim 11 further characterized as being suitable for use in a locomotive for measuring a flow rate of air to a brake pipe of such locomotive.

13. A computer system according to claim 12 wherein said means for determining a condition when such flow of air is equal to zero includes:

means connected to said computer system for ensuring that said computer system is turned on before such airflow is started;

means disposed in said computer and actuated when said computer is turned on for making a first comparison of said second data signal with a first predetermined reference signal to generate a third logical signal indicative of such first of such transducer configurations;

means actuated when said computer is turned on and when said third logical signal has not been generated for making a second comparison of said second data signal with a second predetermined reference signal to generate a fourth logical signal indicative of such second of such transducer configurations; and means actuated when neither said third logical signal nor said fourth logical signal has been generated to repeat said first comparison and said second comparison until one of said third logical signal and said fourth logical signal has been generated.

14. A computer system according to claim 12 wherein said means for determining a condition when such flow of air is equal to zero and for generating a first logical signal indicative of such condition includes:

means for generating a fifth logical signal indicative as to whether a pressure of air in a main reservoir of such locomotive exceeds a pressure of air in an equalizing reservoir of such locomotive by a predetermined amount;

means for generating a sixth logical signal indicative as to whether a pressure of air in such equalizing reservoir equals, within a first predetermined tolerance, a pressure of air in a brake pipe of such locomotive;

means for generating a seventh logical signal indicative as to whether a pressure of air in such brake pipe equals, within a second predetermined tolerance, a setpoint pressure of such equalizing reservoir;

means for generating an eighth logical signal indicative as to whether a signal from an axle speed sensor indicates a condition of zero speed for such locomotive;

means for generating a ninth logical signal indicate as to whether a brake pipe charge status signal indicates a cutout condition; and means responsive to said fifth, sixth, seventh, eighth and ninth logical signals to determine that such flow of air is equal to zero, and for generating a first logical signal indicative of such condition.

15. A computer system according to claim 14 wherein said first predetermined tolerance depends on a tolerance for measurement of pressure in said brake pipe and a tolerance for measurement of pressure in said equalizing reservoir.

16. A computer system according to claim 14 wherein said second predetermined tolerance depends on a tolerance for measurement of pressure in said brake pipe and a tolerance for determination of equalizing reservoir setpoint pressure.

17. A method for calculating a flow rate of air in a flow passage supplying air to a brake pipe of a railroad airbrake system, said method adaptable to two different transducer configurations, each transducer configuration having at least a first transducer and a second transducer; said method comprising:

generating a first logical signal indicating a time when such flow rate of such air is zero;

comparing, at a time when said first logical signal indicates zero flow rate of such air, an output of such second transducer with at least two predetermined signal levels to generate a second logical signal indicating which of two transducer types is used for such second transducer;

using said second logical signal to interpret at least one output of such first transducer and such second transducer to calculate a pressure difference between two fluid pressure taps in such flow passage; and calculating such flow rate of such air based on such pressure difference.

18. A method according to claim 17 wherein said steps of generating said first logical signal and said second logical signal are further characterized as follows:

said computer is turned on before such airflow is started, at which time such first logical signal is generated; and a set of instructions is automatically activated when such computer is turned on, said set of instructions directing said computer to compare said second transducer output with said at least two predetermined signal levels to generate said second logical signal indicative as to which of two transducer types said computer is connected.

19. A method according to claim 17 wherein said steps of generating said first logical signal and said second logical signal further include:

making a comparison to determine whether a pressure in a main reservoir of such locomotive exceeds a pressure in an equalizing reservoir of such locomotive by a predetermined amount;

making a comparison, within a first predetermined tolerance, between such pressure in such equalizing reservoir and a pressure in such brake pipe;

making a comparison, within a second predetermined tolerance, between such pressure in such brake pipe and a setpoint pressure of such equalizing reservoir;

making a determination as to whether an axle speed sensor on such locomotive indicates zero speed;

making a determination as to whether the brake pipe charge status indicates a cutout state; and comparing an output of such second transducer with two predetermined voltage levels to generate said second logical signal.

20. A method according to claim 17 wherein at least one of said at least two predetermined signal levels corresponds to a zero pressure difference in a differential pressure transducer.

* * * * *